J. M. Stiren,
Steam-Boiler Water-Feeder,
N° 36,324. Patented Aug. 26, 1862.
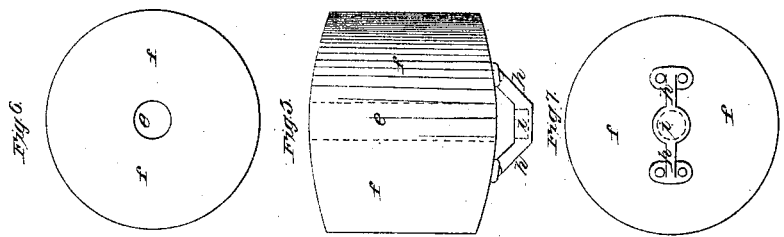
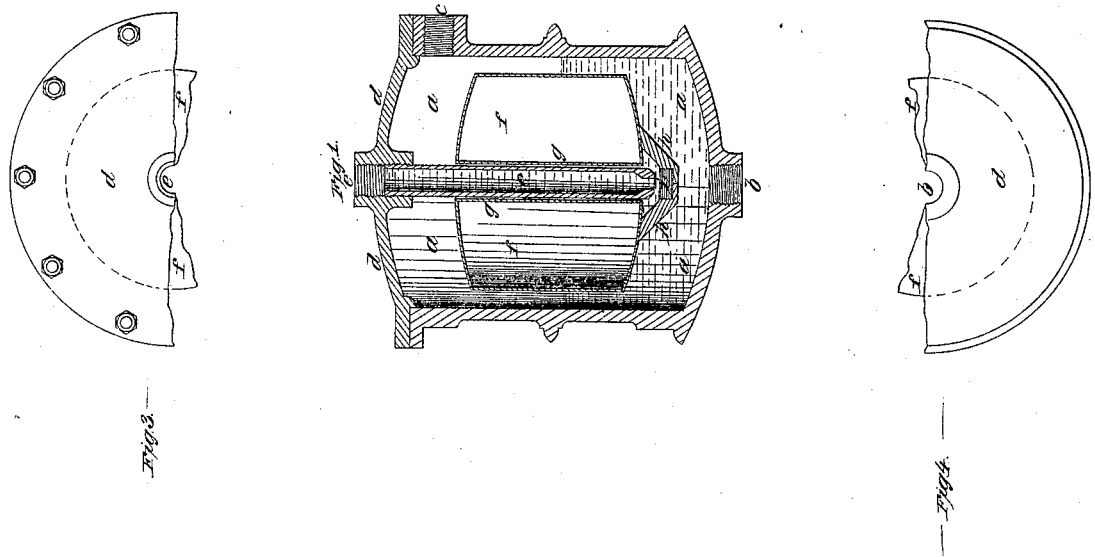
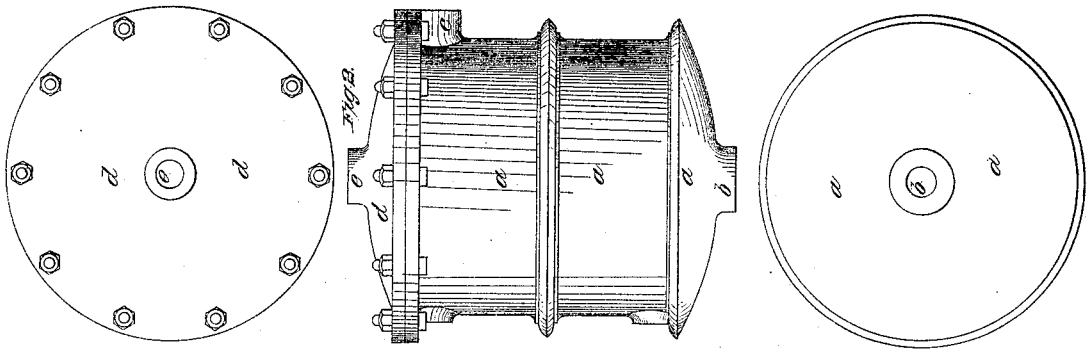
Witnesses:
Lemuel W. Serrell
Tho? Geo Harold
Inventor:
James M. Stiven

UNITED STATES PATENT OFFICE.

JAMES M. STIVEN, OF NEW YORK, N. Y., ASSIGNOR TO HIMSELF, M. TUOMEY, AND JOHN ELDER, JR., OF SAME PLACE.

IMPROVED BOILER-FEEDER.

Specification forming part of Letters Patent No. 36,324, dated August 26, 1862.

*To all whom it may concern:*

Be it known that I, JAMES M. STIVEN, of the city and State of New York, have invented, made, and applied to use a certain new and useful Improvement in Boiler-Feeders; and I do hereby declare the following to be a full, clear, and exact description of the same, reference being had to the annexed drawings, making part of this specification, wherein—

Figure 1 is a vertical section of my said feeder. Fig. 2 is an elevation of the same. Fig. 3 represents a partial and complete plan. Fig. 4 represents a partial and complete inverted plan. Fig. 5 is an elevation of the float. Fig. 6 is a plan, and Fig. 7 is an inverted plan, of said float.

Similar marks of reference denote the same parts.

The present invention is intended for supplying water to the boilers of hot-water warming apparatus from an elevated head, or of supplying water to boilers to maintain a uniform or nearly uniform level of said water where the pressure of water in the supply-pipe is greater than the pressure in the boiler.

My invention consists of a direct-acting float forming a valve, in combination with a pipe passing through said float and supplying the water, the end of which pipe forms a seat for the float-valve, so that when the water descends in the boiler and does not sustain said float with the valve closed the water runs in by its own pressure until it is sufficient to raise the float and shut off the supply.

In the drawings, $a$ is a cylinder, of suitable size and shape, that is located on a level with the water-line to be maintained in the boiler or heating apparatus.

$b$ is a pipe passing from said cylinder to the water-space of the said boiler, and $c$ is a pipe connected to the steam-space or above the water-line.

$d$ is the head to the cylinder, through which a pipe, $e$, passes, that connects with the source or supply of water under pressure. The end of this pipe should be sufficiently contracted to form the required opening or seat; and $f$ is a float made with a central pipe, $g$, that is of a size to move freely over the pipe $e$, but, with the float, be guided by said pipe $e$ in rising and falling. At the lower end of the float is a bridge, $h$, fitted with a valve, $i$. This valve $i$ may be a metallic surface ground tight with the end of the pipe $e$, or a yielding washer of leather or other suitable material. The float $f$ falls by its own weight as the water-level sinks in the boiler, and in so doing opens the end of the pipe $e$, and water flows in until the buoyancy of the float is sufficient to make the valve $i$ close against the pressure and flow of water and stop the same, the size of the opening for the supply of water being proportioned to the relative pressures and the buoyancy of the float.

My apparatus is compact, easily applied to a boiler or steam warming apparatus, and is not liable to get out of repair.

What I claim, and desire to secure by Letters Patent, is—

The float $f$, provided with the pipe $g$, in combination with the supply-pipe $e$ and valve $i$, the parts being fitted and acting in the manner and for the purposes specified.

In witness whereof I have hereunto set my signature this 24th day of July, 1862.

JAMES M. STIVEN.

Witnesses:
LEMUEL W. SERRELL,
THOS. GEO. HAROLD.